United States Patent [19]
Maida

[11] 3,776,111
[45] Dec. 4, 1973

[54] AUTOMATIC EXPOSURE DETERMINING DEVICE

[75] Inventor: Osamu Maida, Tokyo, Japan
[73] Assignee: Nippon Kogaku K.K., Tokyo, Japan
[22] Filed: Nov. 17, 1972
[21] Appl. No.: 307,346

[30] Foreign Application Priority Data
Nov. 30, 1971 Japan.............................. 46/111757

[52] U.S. Cl.............. 95/10 CD, 307/117, 318/280, 352/141
[51] Int. Cl................ G03b 7/08, G03b 9/02, H02p
[58] Field of Search................. 95/10 C, 10 CD, 42, 95/64 R, 64 D; 307/117; 318/280; 352/141

[56] References Cited
UNITED STATES PATENTS

| | | | |
|---|---|---|---|
| 3,476,028 | 11/1969 | Namba et al................. | 95/10 CD X |
| 3,611,894 | 10/1971 | Minneste, Jr..................... | 95/10 CD |
| 3,587,420 | 6/1971 | Llop................................. | 95/10 CD |
| 3,696,719 | 10/1972 | Tauikashi....................... | 95/10 CD |
| 3,430,053 | 2/1969 | Westhaver....................... | 95/10 CD |
| 3,455,227 | 7/1969 | Sato et al. ....................... | 95/10 CD |
| 3,427,941 | 2/1919 | Metzger........................... | 95/10 CD |

Primary Examiner—Joseph F. Peters
Attorney—Harry G. Shapiro et al.

[57] ABSTRACT

A motor driven automatic exposure determining device for a camera in which the motor is operated in forward or reverse direction from a single voltage source. In addition to driving an exposure control element, such as a shutter speed control mechanism or a diaphragm aperture control mechanism, the motor drives a variable impedance of a bridge circuit for balancing the bridge circuit. Another impedance of the bridge circuit is a photoelectric element responsive to light from the scene to be photographed. A transistor switching circuit, comprising four transistors, is employed to control the connection of the motor terminals to the terminals of the single voltage source by providing circuits for energizing the motor for forward or reverse rotation depending upon which of two pairs of the transistors is rendered conductive by a detecting transistor circuit responsive to bridge unbalance and to the direction of unbalance. By a unique interconnection of the detecting circuit and the switching circuit, a single transistor of the detecting circuit renders a pair of transistors of the switching circuit conductive simultaneously and with low power consumption.

6 Claims, 2 Drawing Figures

AUTOMATIC EXPOSURE DETERMINING DEVICE

BACKGROUND OF THE INVENTION

1. Field of the Invention

This invention relates to an automatic exposure determining device for a camera and more particularly to a device of this type which operates from a single voltage source.

2. Description of the Prior Art

In an automatic exposure determining device for a camera known heretofore two voltage sources are employed for driving a motor in opposite directions, respectively, the motor being coupled to a shutter speed control mechanism or a diaphragm aperture control mechanism and being driven in one direction by one voltage source to avoid under-exposure and being driven in the opposite direction by the other voltage source to avoid over-exposure. Such devices, employing two voltage sources, have certain disadvantages. For example, the load on the motor may vary in accordance with the direction of rotation of the motor and hence the power consumption from the voltage sources may be unequal. When batteries are employed as the voltage sources, the irregular power consumption or inequalities in the battery capacities will result in unequal battery life. The unavailability of a center tap in conventional batteries makes the utilization of two separate batteries a necessity. In addition, the use of two voltage sources usually dictates the employment of two off-on switches to avoid undesired battery drain when the circuit is not in operation.

SUMMARY OF THE INVENTION

It is accordingly an object of the present invention to provide an automatic exposure determining device with a drive circuit which operates from a single voltage source for both forward and reverse rotation of the motor, which is simple in construction, and which eliminates the disadvantages of the prior art noted above.

Briefly stated, the automatic exposure determining device of the present invention comprises a motor which is energized by a switching circuit comprising four transistors which are rendered conductive in pairs to connect the terminals of the motor to the terminals of a single voltage source in different circuit arrangements for forward and reverse rotation of the motor. Each pair of transistors of the switching circuit is controlled by a corresponding operating transistor, and the operating transistors are in turn controlled by detecting transistors which detect the unbalance of a bridge circuit in one sense or the other, respectively. The bridge circuit includes four impedances, one of which is a photosensitive element responsive to light from the scene to be photographed, and another of which is adjusted by the motor to balance the bridge. The motor also drives a diaphragm control mechanism or a shutter speed control mechanism in the usual manner.

BRIEF DESCRIPTION OF THE DRAWINGS

The invention will become more fully apparent from the following detailed description taken in conjunction with the accompanying drawings, in which.

DESCRIPTION OF THE PREFERRED EMBODIMENTS

Figure 1:
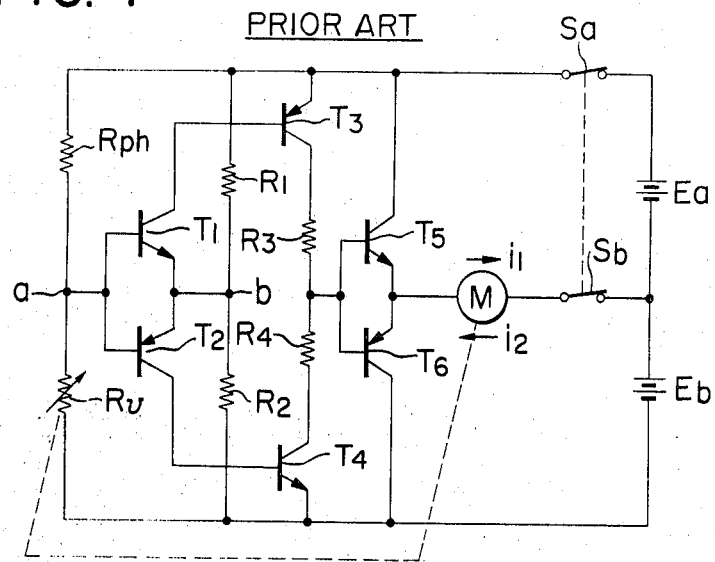
FIG. 1 is a schematic diagram of a prior art device circuit employing two voltage sources.

In order that the present invention may be better understood, the prior art will first be described with reference to FIG. 1, which is a conventional type of drive circuit for an automatic exposure determining device for a camera or the like. In this drive circuit two voltage sources, such as batteries E$a$ and E$b$, are employed to drive a motor M in forward or reverse directions, respectively, the motor being connected to a diaphragm aperture control mechanism (not shown) or to a shutter speed control mechanism (not shown) in a conventional manner. Two manually actuated off-on switches S$a$ and S$b$ are employed. The drive circuit includes a bridge circuit comprising four impedances, which are resistances in the form shown. One of the bridge impedances is a photoelectric element R$ph$, the resistance of which is a function of the light to which the photoelectric element is subjected from the scene to be photographed. A second impedance is a function resistor R$v$, operatively associated with an unshown exposure factor, such as shutter speed, diaphragm aperture, or film sensitivity or the like. Resistors R1 and R2 of equal resistance value constitute the remaining bridge impedances. The bridge is energized by the voltage of the sources E$a$ and E$b$ in series, and an output from the bridge is obtained at terminals $a$ and $b$ when the bridge is unbalanced. An npn transistor T1 and pnp transistor T2 connected in complementary and symmetrical relationship are employed to detect unbalance of the bridge circuit. These transistors are connected, respectively, to pnp transistor T3 and npn transistor T4, which may be termed operating transistors. The collector-emitter paths of transistors T3 and T4 are connected in series with resistors R3 and R4 of equal resistance value, the bases of transistors T3 and T4 being connected to the collectors of transistors T1 and T2, respectively, the emitters of which are connected to terminal $b$ and the bases of which are connected to terminal $a$ of the bridge circuit. An npn transistor T5 and a pnp transistor T6, connected in complementary and symmetrical relationship, constitute a switching circuit for connecting the motor M to one of the voltage sources or the other. The collectors of transistors T5 and T6 are connected to the positive and negative terminals of batteries E$a$ and E$b$, respectively, and the emitters are connected to one terminal of motor M, the other terminal of which is connected to the junction of the batteries through switch S$b$. The bases of transistors T5 and T6 are connected to the junction of resistors R3 and R4.

In operation, when the resistance value of the photoelectric element R$ph$ is smaller than that of the function resistor R$v$, and the potential at output terminal $a$ of the bridge is more positive than the potential at output terminal $b$, that is, when an over-exposure condition exists, transistors T1 and T2 are conductive and non-conductive, respectively, assuming of course that switches S$a$ and S$b$ are closed. Accordingly, transistors T3 and T5 are rendered conductive and transistors T4 and T6 are non-conductive. This provides a normal or forward rotation circuit for the motor M through transistor T5 from voltage source E$a$, current flowing through the motor M in the direction of arrow $i_1$, thereby to rotate the motor in the normal or forward direction. Rotation of the motor reduces the value of function resistor Rv, so as to balance the bridge circuit. Simultaneously, the diaphragm aperture control mechanism or the shutter speed control mechanism is driven so as to provide a proper exposure.

Conversely, when the resistance value of the photoelectric element Rph is greater than that of the function resistor Rv and the potential at output terminal a is less positive than the potential at output terminal b, that is, when an under-exposure condition exists, transistors T2 and T1 will be conductive and non-conductive, respectively, so that transistors T4 and T6 are rendered conductive and transistors T3 and T5 are non-conductive. This provides a reverse rotation circuit for motor M through transistor T6 from voltage source Eb, a current flowing to the motor M in the direction of arrow $i_2$ to thereby rotate the motor in the reverse direction. This rotation of the motor M increases the resistance value of the function resistor Rv, so as to balance the bridge circuit. Simultaneously, the diaphragm aperture control mechanism or the shutter speed control mechanism is driven so as to provide a proper exposure.

When the resistance values of the photoelectric element Rph and the function resistor Rv become equal, that is, when a proper exposure condition is reached, the bridge will be balanced, and the potential at terminals a and b will be equal. As a result, transistors T1 and T2 will both be non-conductive, and accordingly, neither of the motor energization circuits will be completed. The motor will thus be deenergized. In this manner, as soon as the function resistor Rv is driven from the motor M so as to equalize the resistance value of the function resistor Rv with that of the photoelectric element Rph, the diaphragm aperture control mechanism will be driven to provide an optimum value of exposure factor, such as diaphragm aperture or shutter speed, thus accomplishing automatic exposure determination.

Nevertheless, the motor drive circuit of FIG. 1, employing two voltage sources, suffers from the disadvantages noted previously.

Figure 2:
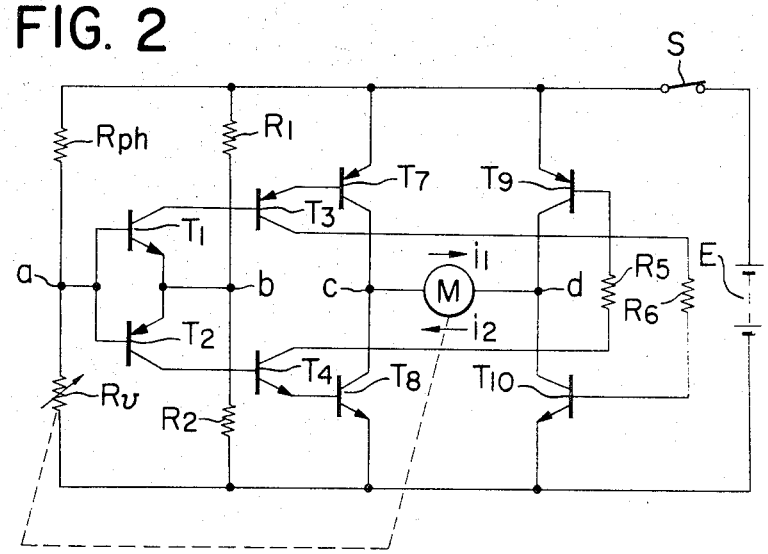
FIG. 2 is a schematic diagram of a drive circuit in accordance with the invention, employing a single voltage source.

A motor drive circuit according to an embodiment of the present invention will now be described with reference to FIG. 2.

In accordance with the invention, a single voltage source, such as battery E, is employed to energize the motor M for both forward and reverse rotation of the motor. A single manually actuated off-on switch S is employed instead of switches Sa and Sb of FIG. 1. The bridge circuit and its interconnection with the motor M, which balances the bridge and drives an exposure control mechanism (not shown) are the same as described above and need not be further described. Operating transistors T3 and T4 are employed also, but the connection of these transistors to the motor switching circuit and the motor switching circuit itself are quite different from the prior art embodiment of FIG. 1. Thus, in FIG. 2 the switching circuit comprises four switching transistors, T7, T8, T9, and T10. Transistors T7 and T9 are pnp type, and transistors T8 and T10 are npn type. Transistors T7 and T8 have their collectors connected to one terminal c of motor M, and transistors T9 and T10 have their collectors connected to the other terminal d of the motor M. The emitters of transistors T7 and T9 are connected to the positive side of battery E through switch S, and the emitters of transistors T8 and T10 are connected to the negative terminal of battery E.

The bases of transistors T3 and T4 are connected to the collectors of transistors T1 and T2 as in the prior art embodiment of FIG. 1, but the emitters of transistors T3 and T4 are connected to the bases of transistors T7 and T8, respectively, and the collectors of transistors T3 and T4 are connected to the bases of transistors T10 and T9, respectively, through resistors R6 and R5.

In operation, when the bridge is unbalanced in one direction or the other, either transistor T1 or transistor T2 will be rendered conductive in the manner described with reference to FIG. 1. Assuming that output terminal a of the bridge is more positive than output terminal b, transistor T1 will be conductive and transistor T2 will be non-conductive. When transistor T1 becomes conductive, transistors T3, T7, and T10 will also become conductive, transistors T4, T8 and T9 remaining non-conductive. Transistor T10 is rendered conductive by the connection through resistor R6 to the collector of transistor T3. When transistor T7 is conductive, the potential at terminal c of the motor is approximately equal to the potential at the positive terminal of voltage source E, and when transistor T10 is conductive, the potential at terminal d of the motor is approximately equal to the potential at the negative terminal of the voltage source. Thus, current flows through the motor M in the direction of arrow $i_1$ to rotate the motor in the normal or forward direction. Such rotation of the motor drives the function resistor Rv in a direction for reducing the resistance value of resistor Rv and for nullifying the potential difference between the output terminals a and b. Simultaneously, the motor drives the diaphragm aperture control mechanism or the shutter speed control mechanism so as to provide a proper exposure.

When the bridge is unbalanced in the opposite direction, that is, when photoelectric element Rph has greater resistance than that of the function resistor Rv, so that the potential at terminal b is more positive than the potential at terminal a, transistors T2, T4, T8, and T9 will be rendered conductive, transistors T1, T3, T7 and T10 remaining non-conductive. With transistor T8 conductive, the potential at motor terminal c is approximately the same as the potential at the negative terminal of voltage source E, and with transistor T9 conductive, the potential at motor terminal d is approximately the same as that of the positive terminal of the voltage source. Hence, a reverse rotation circuit is established for the motor M, current passing through the motor in the direction of arrow $i_2$ to rotate the motor in the reverse direction. Such reverse rotation of the motor M drives the function resistor Rv operatively associated therewith in the direction for increasing the resistance value of the resistor Rv and for nullifying the potential difference between the output terminals a and b of the bridge. Simultaneously, the motor drives the diaphragm aperture control mechanism or the shutter speed control mechanism so as to provide a proper exposure. As in the prior art embodiment of FIG. 1, when the bridge is balanced, that is, when the potential at terminals a and b is the same, transistors T1 and T2 are both non-conductive and therefore all of the other transistors are rendered non-conductive and the motor is de-energized.

In this manner, the function resistor Rv is driven from the motor M so as to equalize the resistance value thereof with the photoelectric element Rph, and the exposure factor associated therewith, such as shutter speed, diaphragm aperture or the like, is driven to provide an optimum exposure condition, thus accomplishing automatic exposure determination.

The present invention thus eliminates the disadvantages which characterize the prior art system employing two voltage sources. Although two additional transistors are employed, in comparison to the prior art circuit, one of the batteries and one of the off-on switches are eliminated. Reduced power consumption and simplification of the circuit arrangement are attained in the present invention by virtue of the fact that the base currents of transistors T7 and T9 render transistors T10 and T8 conductive, respectively.

While a preferred embodiment of the invention has been shown and described, it will be apparent to those skilled in the art that changes can be made in this embodiment without departing from the principles and spirit of the invention, the scope of which is defined in the appended claims. For example, although the transistor T3 and T4 in the illustrated embodiment of the invention have their respective bases connected to the detecting transistors T1 and T2, it will be apparent that a signal current amplifier may exist therebetween. Furthermore, instead of adjusting the resistance value of the function resistor Rv to balance the bridge, an equivalent result may be attained by disposing means such as a diaphragm or filter in front of the photoelectric element Rph and by adjusting the diaphragm or filter so as to vary the resistance value of the photoelectric element, thereby accomplishing automatic exposure determination.

The invention claimed is:

1. An automatic exposure determining device, comprising a reversibly rotatable electric motor for setting an exposure factor in one sense or the opposite sense, depending upon the direction of rotation, to provide proper exposure, a voltage source for said motor, a switching circuit for connecting said motor to said voltage source for rotation of said motor in one direction or the opposite direction, said switching circuit comprising a first pair of switching transistors for connecting terminals of said motor to terminals of said voltage source when conductive and a second pair of switching transistors for reversely connecting said terminals of said motor to said terminals of said voltage source when conductive, means including a photosensitive element for producing a first output in response to a first exposure condition and for producing a second output in response to a second exposure condition, first transistor means connected to said first pair of switching transistors for rendering said first pair of switching transistors conductive in response to said first output, and second transistor means connected to said second pair of switching transistors for rendering said second pair of switching transistors conductive in response to said second output, said first transistor means comprising a first transistor having its emitter connected to the base of a switching transistor of said first pair and having its collector connected to the base of the other switching transistor of said first pair, and said second transistor means comprising a second transistor having its emitter connected to the base of a switching transistor of said second pair and having its collector connected to the base of the other switching transistor of said second pair.

2. A device in accordance with claim 1, wherein the switching transistors of the first pair are complementary types and the switching transistors of the second pair are complementary types, one of said motor terminals being connected to said terminals of said source through the emitter-collector paths of one switching transistor of each pair, respectively, and another of said motor terminals being connected to said terminals of said source through the emitter-collector paths of the other switching transistor of each pair, respectively.

3. A device in accordance with claim 2, wherein said first transistor is of the same type as the switching transistor to which its emitter is connected and wherein said second transistor is of the same type as the switching transistor to which its emitter is connected.

4. A device in accordance with claim 3, wherein the connections of the collectors of the first and second transistors to the bases of the switching transistors include series resistors.

5. A device in accordance with claim 4, wherein said means for producing said outputs comprises a bridge circuit and a pair of detecting transistors connected to output terminals of the bridge circuit for detecting unbalance of the bridge circuit in one direction or the other, respectively, and for rendering said first transistor or said second transistor conductive, said bridge circuit including said photosensitive element and including means connected to said motor for balancing the bridge circuit.

6. A device in accordance with claim 5, wherein said detecting transistors are complementary types having their bases connected to one of said output terminals, their emitters connected to another of said output terminals, and their collectors connected to the bases of said first and second transistors, respectively.

* * * * *